Dec. 11, 1945.   W. H. GILLE   2,390,581
CONTROL DEVICE
Filed Feb. 22, 1943   2 Sheets-Sheet 1
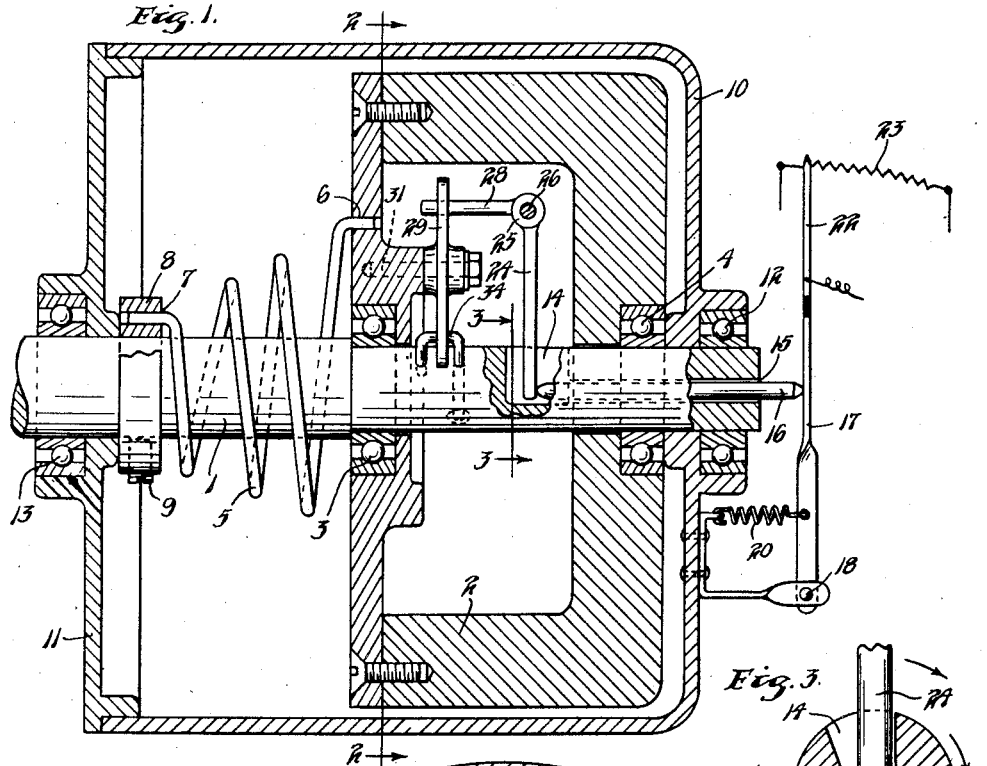
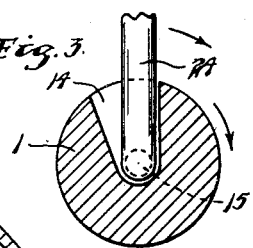
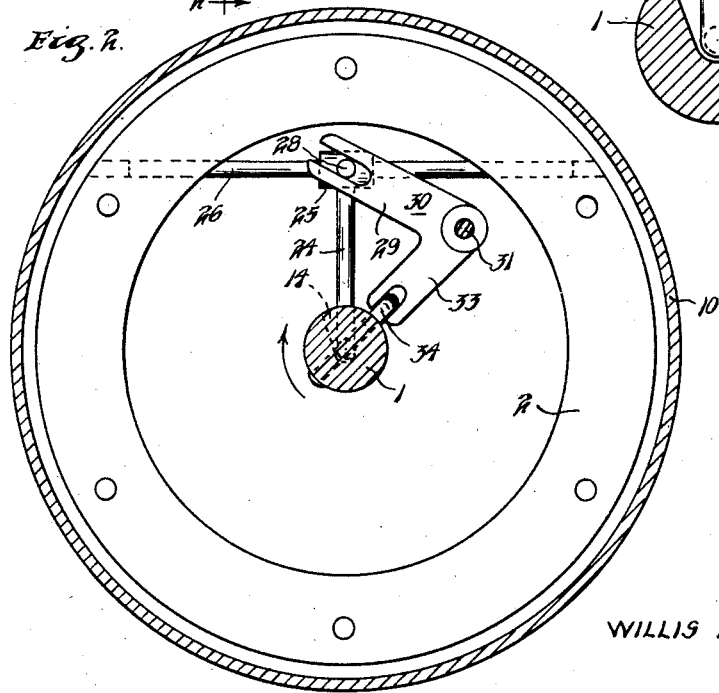
Inventor
WILLIS H. GILLE
BY George N. Fisher
Attorney Dec. 11, 1945.  W. H. GILLE  2,390,581
CONTROL DEVICE
Filed Feb. 22, 1943  2 Sheets-Sheet 2
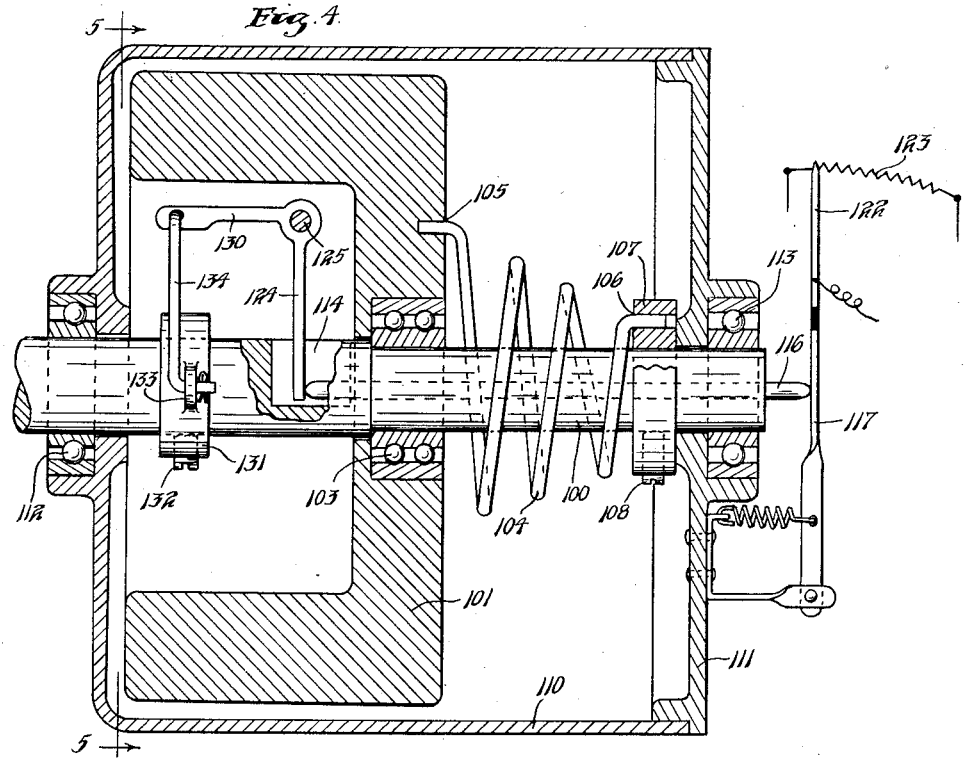
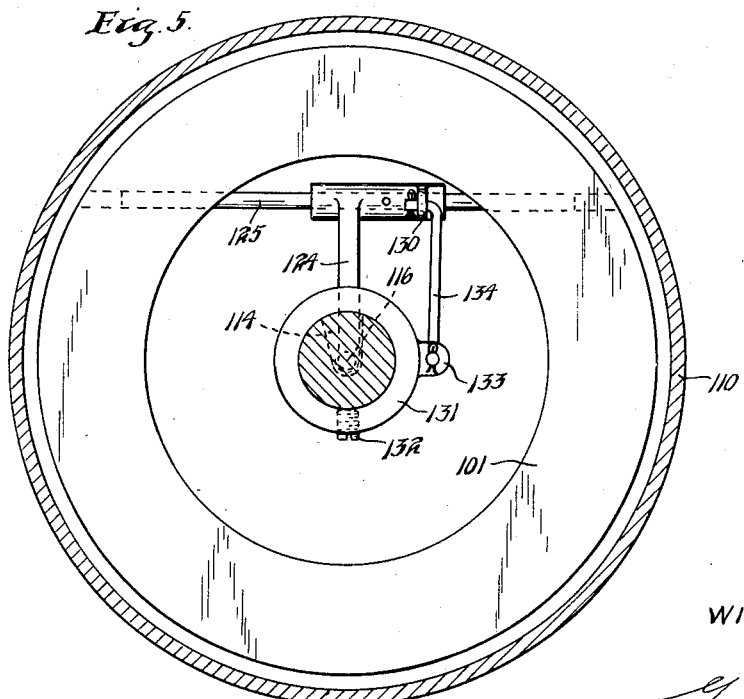
Inventor
WILLIS H. GILLE
George H. Fisher
Attorney Patented Dec. 11, 1945

2,390,581

UNITED STATES PATENT OFFICE 2,390,581

CONTROL DEVICE

Willis H. Gille, St. Paul, Minn., assignor to Minneapolis-Honeywell Regulator Company, Minneapolis, Minn., a corporation of Delaware Application February 22, 1943, Serial No. 476,796

3 Claims. (Cl. 201—48)

My present invention relates to a control device operated in accordance with the angular acceleration of a rotating shaft.

An object of my invention is to provide an improved device for producing a control effect variable in accordance with the acceleration of a rotating shaft.

Another object is to produce an improved acceleration responsive control device of the type wherein relative angular motion of two rapidly rotating members is utilized to position a movable control member relative to a stationary control member.

Another object is to produce an improved control device of the general type shown and claimed in the copending application of Albert E. Baak, filed February 22, 1943, Serial No. 476,799.

Another object of my invention is to provide a novel bell-crank lever arrangement whereby the relative movements of two rapidly rotating members are used to position a movable control member relative to a stationary control member.

Another object of my invention is to provide a rotatable driving member and a rotatable driven member resiliently connected together, and a first bell-crank lever pivotally connected to said driven member and having one end thereof engaging the driving member whereby said first bell-crank lever is actuated by the difference in the rate of rotation of said driving and driven members for actuating a second bell-crank lever for performing a control function.

Other objects and advantages of this invention will be apparent from a consideration of the accompanying specification, claims, and drawings, in which Figure 1 is a cross-sectional view of one embodiment of my invention with certain parts broken away so as to better illustrate the same;

Figure 2 is a sectional view taken along the line 2—2 of Figure 1, looking in the direction of the arrows;

Figure 3 is a sectional view taken along the line 3—3 of Figure 1 and looking in the direction of the arrows;

Figure 4 is a sectional view of a different embodiment of my invention; and

Figure 5 is a cross-sectional view taken along the line 5—5 of Figure 4, and looking in the direction of the arrows.

Figures 1, 2 and 3

Referring now to the drawings, numeral 1 indicates a driving shaft on which a hollow, generally cylindrical mass 2 is rotatably mounted by bearings 3 and 4. The mass 2 is connected to the driving shaft 1 by a suitable resilient spring member 5, connected at 6 to the mass 2 and at 7 to a collar 8 fixed on the driving shaft 1 by a set screw 9. The normal angular position of mass 2 on shaft 1 may be adjusted by means of the set screw 9. This adjustment of the collar 8 also functions to position the arm 24 in respect to the sides of the slot 14 and consequently governs the extent of movement of the rod 16 from its normal position.

The mass 2 is enclosed by a housing 10 which is attached by suitable means (not shown) to a base 11. The housing 10 and base 11 carry oppositely disposed bearings 12 and 13, respectively, in which shaft 1 is journaled.

Provided in the driving shaft 1, as shown in Figures 1 and 3, is a longitudinally extending slot 14 having a generally V-shaped cross-section, as shown in Figure 3. The shaft 1 is hollowed to provide a passage 15 extending from the end of the shaft 1 into the slot 14. A thrust rod 16 is positioned within said channel and has one end thereof positioned within the slot 14 and the opposite end thereof extending out of the free end of the driving shaft 1, as best shown in Figure 1. The rod 16, as will be explained, is arranged for axial movement in relation to the shaft 1 and bears upon an arm 17 pivoted at 18 and biased for counter-clockwise rotation about pivot 18 by a spring 20. The spring 20 acts through arm 17 to bias the thrust rod 16 axially within the shaft 1 towards the left, as viewed in Figure 1. The end of the arm 17 carries a slider 22 which bears upon an elongated resistance element 23. Thus, by actuating the rod 16 as will be explained, the arm 17 may be caused to pivot at 18 in a clockwise or counter-clockwise direction, depending upon the direction of the rectilinear actuation of the rod 16, so as to position the slider 22 along the resistor 23.

Projecting radially into the slot 14 provided in the drive shaft 1 is an arm 24 of a bell-crank lever 25 pivoted on a pin 26 fixed inside the hollow mass 2. The end of the arm 24 is adapted to operably engage the end of rod 16 positioned within the slot 14 so that upon rotation of the bell-crank lever 25 about its pivot 26, the arm 24 moves the actuating pin 16. The second arm 28 of the bell-crank lever 25 extends generally in an axial direction along the shaft 1. The arm 28 engages an arm 29 of a bell-crank lever 30, as shown in Figure 2. The arm 29 is preferably bifurcated at its end and the end of the arm 28 is positioned between the said bifurcations. The bell-crank lever 30 is pivoted on a pin 31 carried by the mass 2 and extending parallel to the shaft 1. The second arm 33 of the bell-crank lever 30 has a bifurcated end portion for engaging the bight of a U-shaped member 34 which is fixed on the shaft 1.

As long as the shaft 1 rotates at a constant speed, the mass 2 does not move angularly relative to the shaft 1. Upon an acceleration or deceleration of the shaft 1, however, the mass 2, because of its inertia, accelerates or decelerates more slowly, and the angular position of the mass 2 relative to the shaft 1 changes. A limited amount of such relative angular movement is permitted by the spring 5 and the slot 14. If the shaft 1 and mass 2 are rotating clockwise as viewed in Figure 3, an acceleration of shaft 1 causes the pivotal movement of the bell-crank lever 30 in a counter-clockwise direction, as viewed in Figure 3, which produces counter-clockwise movement of the bell-crank lever 25, as viewed in Figure 1. The arm 24 of the bell-crank lever 25 thereby drives the rod 16 towards the right, as viewed in Figure 1, rotating the arm 17 in a clockwise direction and moving slider 22 to the right along the resistance 23. Obviously, upon a deceleration of the shaft 1, the bell-crank lever 30 is pivoted in an opposite or clockwise direction, causing clockwise pivotal movement of the bell-crank lever 25. The arm 24 of bell-crank lever 25 then permits inward movement of the pin 16 under the biasing force of the spring 21 causing adjustment of the slider 22 to the left along resistance 23.

Figures 4 and 5

A second form of my invention is illustrated in Figures 4 and 5 wherein a rotatable shaft is indicated by numeral 100 and there is rotatably mounted thereon a cup-shaped mass 101 journaled on the shaft 100 by means of a bearing 103. The mass 101 is connected to the driving shaft 100 by a suitable resilient spring member 104 connected at 105 to the driven member 101 and at 106 to a collar 107 adjustably fixed on the driving shaft 100 by a set screw 108.

The mass 101 is enclosed by a cup-shaped housing 110 having a cover 111. The shaft 100 is journaled in bearings 112 and 113 carried by the housing 110 and cover 111, respectively.

There is provided in the driving shaft 100 a longitudinally extending slot 114 formed in like manner to the slot 14 previously described and shown in Figure 1. A thrust rod 116 extends through a bore in the shaft 100 having one end within the slot 114 and the opposite end extending from the end of the driving shaft 100 in a manner similar to that previously described in reference to pin 16 shown in Figure 1. The pin 116 is arranged for axial movement in relation to the shaft 100 within the shaft 100 so as to actuate the control arm 117 and move the slider 122 along a resistor 123. The arm 117 and related structure is the same as that previously described in reference to Figure 1 and a detailed discussion of the same here is deemed unnecessary.

A shaft 125 extends transversely across the interior of the cup-shaped mass 101 and is journaled therein at its opposite ends. An arm 124 is fixed on the shaft 125 and projects into the slot 114 where it is engaged by an end of the rod 116.

A second arm 130 is also affixed to the shaft 125 and projects therefrom at an angle to the arm 124. Mounted on the shaft 100 is a collar 131 fixedly positioned on the shaft 100 by a set screw 132. A lug 133 projects radially from the collar 131 and is positioned immediately below the end of the arm 130. A link 134 connects the lug 133 and arm 130. Thus, movement of the lug 133 in response to rotary movement of the shaft 100 relative to the member 101 will be conveyed to the shaft 125 through the link 134 and arm 130. Such movement will cause a rotation of the shaft 125 and the arm 124 to translate the rod 116.

As previously explained in reference to Figure 1 such axial movement of the rod 116 causes movement of slider 122 along resistance 123.

While I have shown and described certain preferred embodiments of my invention, other modifications thereof will readily occur to those skilled in the art, and I therefore wish my invention to be limited only by the appended claims.

I claim as my invention:

1. In control apparatus of the class including a driving member, a driven member, a resilient driving connection between said driving and driven members, and one of said members rotatably mounted on the other of said members; the improvement comprising a first pin concentrically positioned in said other member and axially movable in relation thereto, a first bell crank lever pivotally mounted in said one member, said first bell crank lever having one end operably engaging one end of said first pin, a second bell crank lever pivotally mounted in said one member, said second bell crank lever having one end engaging the other end of said first bell crank lever, a second pin mounted in said other member, the other end of said second bell crank lever operably engaging said second pin whereby upon relative rotary movement of said one member in relation to said other member said first and second bell crank levers are pivoted in such a manner as to cause axial movement of said first pin for performing a control function, and abutment means adjustably limiting the relative movement of said driving and driven members and providing at times a nonyielding driving connection therebetween.

2. Control apparatus, comprising in combination, a rotatable shaft, a mass rotatably mounted on said shaft, means resiliently connecting said mass and said shaft to permit relative angular movement of said mass and shaft upon acceleration and deceleration of said shaft, said shaft having a slot adjacent said mass and a hollow portion extending from an end of said shaft to said slot, a member projecting into said slot and providing a connection through which said mass may be driven by said shaft, a thrust rod movable within said hollow portion and engaging said member, means carried by said mass for moving said member upon relative angular movement of said mass and said shaft to modulatingly position said thrust rod axially of said shaft and at a given ratio to said angular movement, said connected member being disposed to normally assume a neutral position, said resilient means being operable to yieldably resist departure of said shaft or said mass from said neutral position, means for altering the location of said neutral position and thus altering said ratio between said angular movement and the modulating movement of said rod, an elongated electrical resistance element, a contact slidable along said resistance element, and a connection between said thrust rod and said contact for positioning said contact along said element.

3. Control apparatus, comprising in combination, a shaft, spaced stationary members for supporting said shaft, bearing means in each of said stationary members for rotatably mounting said shaft, a mass rotatably mounted on said shaft between said members, means resiliently connecting said shaft and said mass to permit relative angular movement of said mass and shaft upon acceleration of said shaft, said shaft having a slot between said members and a hollow portion extending from said slot through one of said bearing means, a member extending into said slot and providing abutment means limiting relative movement of said shaft and said mass, a thrust rod movable within said hollow portion and engaging said last-mentioned member, said slot providing means for limiting the longitudinal movement of said thrust rod, means carried by said mass for moving said member and thrust rod axially of said shaft upon relative angular movement of said mass and said shaft, means operable to vary the extent of relative angular movement of said mass and said shaft to produce a given axial movement of said rod, and control means operable by said thrust rod upon axial movement thereof.

WILLIS H. GILLE.